Aug. 17, 1965  J. P. MOORHEAD  3,200,772
FREIGHT LOADING APPARATUS
Filed Feb. 14, 1962  2 Sheets-Sheet 1
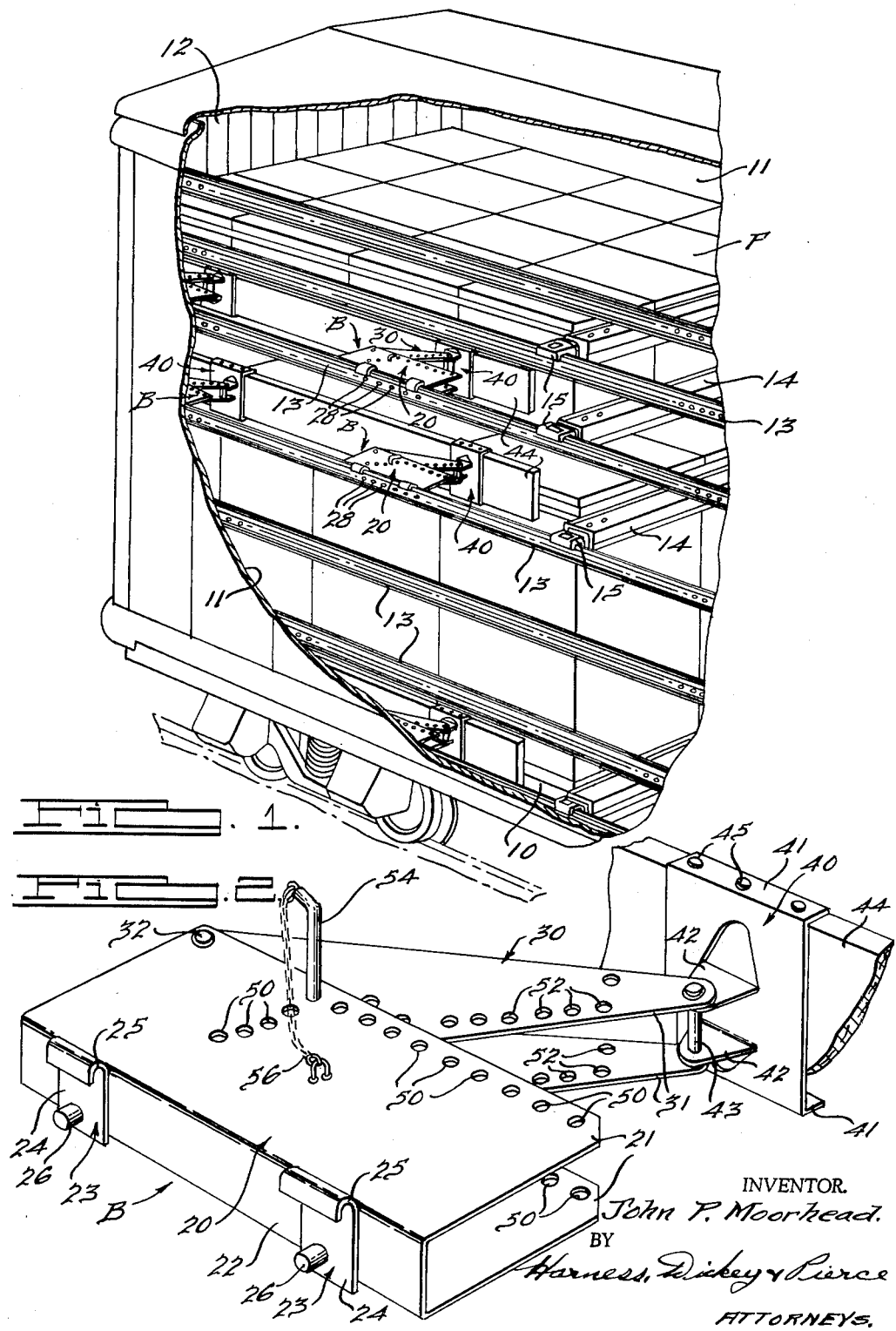
INVENTOR.
John P. Moorhead.
BY
Harness, Dickey & Pierce
ATTORNEYS.

Aug. 17, 1965    J. P. MOORHEAD    3,200,772
FREIGHT LOADING APPARATUS
Filed Feb. 14, 1962    2 Sheets-Sheet 2
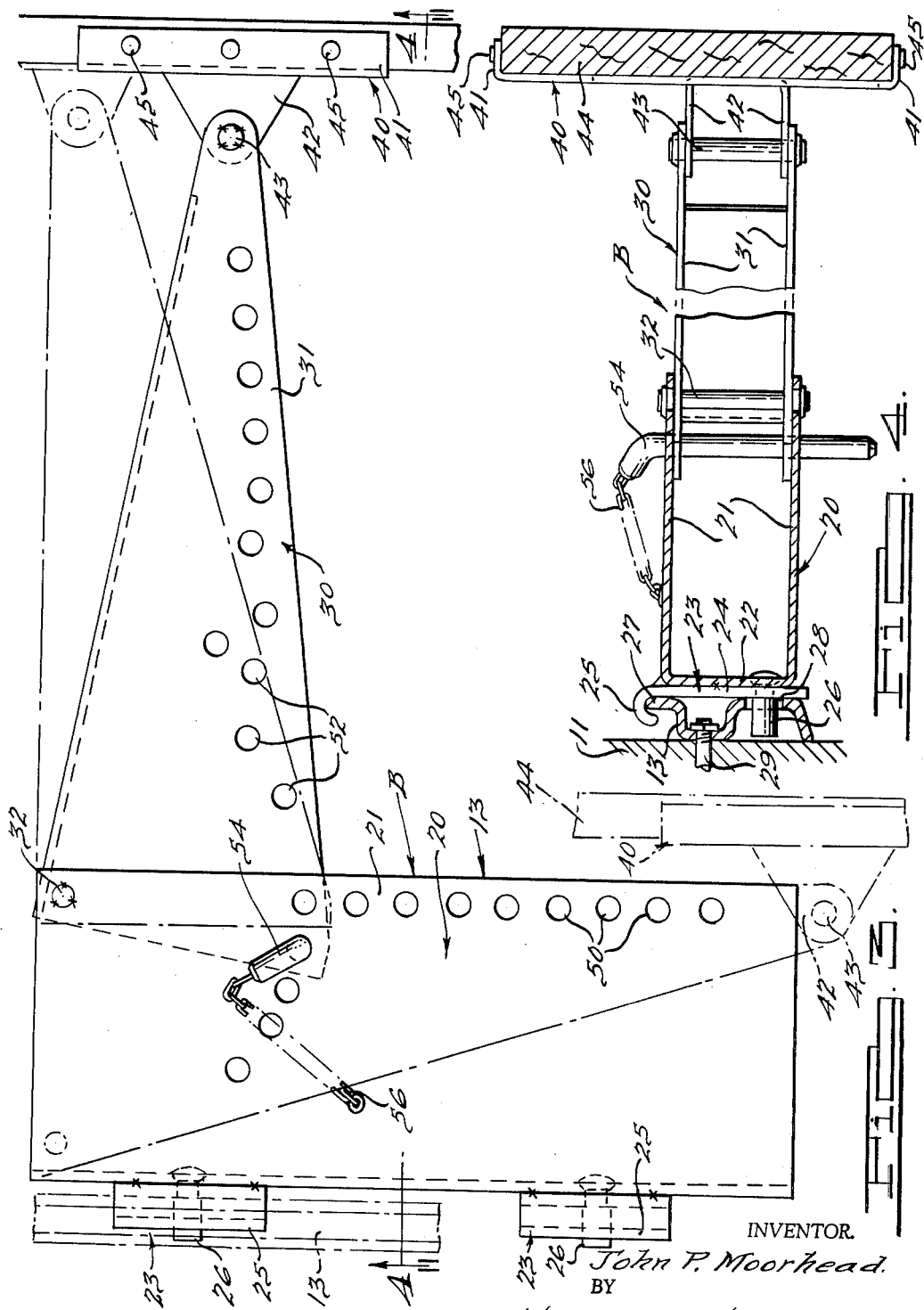
INVENTOR.
John P. Moorhead.
BY
Harness, Dickey & Pierce
ATTORNEYS.

United States Patent Office 3,200,772
Patented Aug. 17, 1965

3,200,772
FREIGHT LOADING APPARATUS
John P. Moorhead, Plymouth, Mich., assignor to Evans Products Company, Plymouth, Mich., a corporation of Delaware
Filed Feb. 14, 1962, Ser. No. 173,170
7 Claims. (Cl. 105—369)

This invention relates to improved loading apparatus, which is readily adjustable and widely adaptable to hold freight articles of different types in vehicles or storage spaces, and more particularly to improved equipment of this nature which is combined with a vehicle, such as a railway freight car, to hold or brace a wide variety of packages or parts during shipment.

One of the principal objects of the invention is to provide apparatus of the above-described type involving means for bracing or holding packages or other freight against the sidewall of a freight container, such for instance as a railway freight car, instead of against an endwall thereof, as is conventional practice.

Another object of the invention is to provide adjustable means adapted to occupy the space between a load of freight and the sidewall of a freight car or other container when the load of freight is insufficient to fill the width of the container, to thereby brace or hold the freight against the opposite sidewall to prevent lateral shifting or swaying thereof.

Another object of the invention is to provide a device of this type in which the hanger member and supporting arm are formed of substantially U-shaped channel members adapted for nesting engagement in the nonextended or collapsed position of the parts so that the device may be employed to brace freight loads when the space between the load of freight and the sidewall of the freight container is quite small.

Another object of the invention is to provide a device of this type in which small or minute adjustments may be made in the supporting arm and the arm locked in its adjusted position. This is accomplished by providing a plurality of sets of aligned, spaced apertures in the flanges of the hanger member and supporting arm, the pattern of said apertures being so designed that sets of these apertures will come into registration upon small adjustments of said supporting arm whereby a locking pin may be engaged with the registering aperture to lock the supporting arm in its adjusted positions.

The objects and advantages of the invention are achieved in a simple but effective manner by the use of side sway brackets each comprising a hanger member adapted for attachment at selected positions to a belt rail secured to a wall of the container; a supporting arm pivotally connected to said hanger member for angular adjustment with respect thereto; and an adapter bracket pivotally connected to the free end of said supporting arm for mounting an elongated thrust member adapted to engage the load of freight. These parts are so designed that they may be economically manufactured from sheet metal by simple stamping operations, may be assembled with facility, and may be secured together by a few welding operations.

In the use of the device of this invention one or more of the side sway brackets are attached at selected positions to a belt rail secured to the side of the freight car or other container. An elongated freight-engaging or thrust-resisting member such as a board or the like is secured to the adapter bracket on the end of the supporting arm and the supporting arm is angularly adjusted to engage the board with the freight whereupon the arm is secured in its adjusted position by passing a locking pin through registering apertures in the arm and the hanger member to which the arm is pivoted. The engagement of the board with the freight braces the freight against the opposite sidewall of the container and prevents lateral shifting or swaying movement thereof.

The various objects and advantages of the invention and the novel details of construction of the embodiment illustrated will become more apparent as this description proceeds, especially when considered in connection with the accompanying drawings in which:

FIG. 1 is a fragmentary perspective view, partly broken away, of a freight container, such as a railway freight car, with devices made in accordance with this invention installed therein, FIG. 2 is a perspective view of a side sway bracket made in accordance with this invention, FIG. 3 is a top plan view of the device, and FIG. 4 is a sectional view taken substantially on the plane indicated by line 4—4 in FIG. 3.

Referring now to the drawings, it will be noted that the invention is shown as installed in a railway freight car, although it may obviously be employed with equal facility in connection with different types of vehicles or storage spaces.

As shown in FIG. 1, the freight car comprises the usual floor structure 10, opposed sidewalls 11, and an endwall 12, one of which is shown in FIG. 1. Secured to the sidewall 11 of the storage space is a series of horizontally-disposed, longitudinally-extending, vertically-spaced side rails or belt rails 13, the belt rails 13 being shown on only one side of the railway freight car in FIG. 1.

The freight F is shown as being braced against endwise shifting in the vehicle or storage space by means of cross bars 14 adjustably and detachably secured by end fittings 15 to the belt rails 13.

The purpose of this invention is to provide a device adapted to occupy the space between a load of freight F and the sidewall 11 of a freight car or other container when the load of freight is insufficient to fill the width of the container, to hold the freight against the opposite sidewall. The devices are indicated generally by the reference character B.

Each of the devices B comprises a channel-shaped hanger member 20 which is U-shaped in cross section to provide a pair of spaced flanges 21 and a base or web portion 22. Because of its simple construction, the hanger member 20 may be conveniently produced from sheet metal by a simple stamping operation. As shown the hanger member 20 is substantially rectangular in shape. Attached to the base or web 22 of the hanger member, as by welding or the like, is one or more, here shown as two, attachment fittings 23 for adjustably attaching and securing the device to the belt rail 13 at selected positions. Preferably two spaced apart fittings 23 are employed to promote stability o fthe hanger 20 when the same is mounted on the belt rail. Each attachment fitting 23 consists of a face plate 24 provided with a hook-shaped portion 25 and a pin 26.

While the particular type of belt rail employed forms no essential part of the present invention, one practical type of belt rail 13 is illustrated in FIG. 1 and in cross section in FIG. 4. As shown, this type of belt rail comprises upright flange 27 adapted to be engaged by the hook portion 25 of the attachment fittings 23 and a plurality of apertures 28 (see FIGS. 1 and 4) adapted to be engaged by the pin 26 of the attachment fittings 23. The belt rail may be secured to the sidewall 11 of the freight car by any type of fastening means, bolts 29 being shown in FIG. 4. The hanger is attached to the belt rail by engaging the hook 25 of the fitting 23 with the upright flange 27 of the belt rail and then allowing the device to rotate downwardly, by its own weight, so that the pin 26 engages an adjacent aperture 28 in the belt rail to prevent movement of the device along the belt rail. No provisions are made for locking the hanger against upward movement and consequent disengagement from the belt rail, the weight of the unit being depended upon to accomplish this end. However, the weight of the device is such that accidental disengagement is unlikely, and obviously some additional latching means (not shown) may be employed if desired.

The reference character 30 indicates a supporting arm which is channel-shaped in cross section to provide a pair of spaced flanges 31. This supporting arm may also be produced from sheet metal by a simple stamping operation. The supporting arm 30 is shown as having a triangular shape or configuration. The larger end of the supporting arm is pivotally connected between the side flanges 21 of the hanger member 20 by means of a pivot pin 32 passing through aligned apertures in the two members. The pivot pin 32 may be secured in place by welding to either the hanger member or the supporting arm. It will be noted that the pivotal connection 32 is arranged at one end of the hanger member 20 adjacent the outer edge of the flanges 21 and at one corner of the supporting arm 30. As stated, the supporting arm 30 is pivoted between the flanges of the hanger member 20 so that the supporting arm may be substantially nested or contained within the channel portion of the hanger member in one extreme position of the supporting arm; i.e., in its fully closed or collapsed position. Also, the channel-shaped hanger member and supporting arm are assembled with the channels of the said members in confronting relation for a purpose yet to be referred to.

The reference character 40 indicates a channel-shaped adapter bracket having flanges 41 and mounting or attaching ears or lugs 42 punched or struck out from the web portion of the channel member. The end of the supporting arm 30 and the ears 42 are provided with aligned apertures to receive a pivot pin 43 which may be secured in place by welding the same to either the arm 30 or the ears 42. Secured within the channel-shaped member 40 is a freight-engaging or thrust-resisting member 44 which may be and is shown as a wooden board. The thrust member 44 is retained in position by means of nails 45 driven through apertures in the flanges 41.

The pivotal connection between the adapter bracket 40 and the supporting arm 30 permits the thrust member 44 to adjust itself into a position substantially contiguous to the freight load.

Arranged adjacent the edges of the flanges 21 of the hanger member 20 are a plurality of aligned, spaced apertures 50 and arranged adjacent the edges of the flanges 31 of the supporting arm 30 is a complementary set of aligned, spaced apertures 52. The pattern of these aligned apertures 50 and 52 is such that as the supporting arm 30 is adjusted with respect to the hanger member 20, sets of apertures 50 and 52 will come into registration to receive a locking pin 54 to lock the arm in its adjusted position. The pattern of the apertures 50 and 52 has been designed so that small adjustments of the arm 30 may be made. The locking pin 54 may conveniently be attached to the hanger member 20 by means of a length of chain 56.

In use of the invention it is preferred that two of these devices be employed in connection with each thrust member 44, one being arranged near each extremity of the thrust member 44. However, it should be understood that in some instances, a single device may be employed located adjacent the center of the thrust member 44. With the hanger member properly adjusted on and secured to the belt rail 13, as illustrated in FIGS. 1 and 4, the thrust member 44 is secured to the adapter brackets 40 and the arms 30 are adjusted to position the thrust member 44 against the load of freight. As mentioned, the pivotal connection 43 between the supporting arms 30 and the adapter brackets 40 permit the thrust member 44 to align itself so as to be substantially contiguous to the freight load.

The locking pin 54 of each device is then inserted in the sets of apertures 50 and 52 which register or most nearly register, whereupon the arms 30 are locked in their adjusted position with the thrust member 44 engaging the freight load.

As shown in dotted lines in FIG. 3, the supporting arm 30, in its closed or nonextended position, is substantially nested or contained within the hanger member 20 so that the device may be employed to brace freight loads when the space between the load of freight and the sidewall of the car is quite small.

While a commercially practical embodiment of the invention has been described and illustrated herein somewhat in detail, it will be understood that various changes may be made as may come within the purview of the accompanying claims.

What is claimed is:

1. A freight holding device adapted to occupy the space between a load of freight and the wall of a freight car or other container to hold the freight against the opposite wall comprising, a hanger member, means secured to said hanger member for detachably supporting said hanger member at selected positions to a belt rail secured to said first wall, a supporting arm pivotally connected to said hanger member for angular adjustment from a fully retracted and substantially nested position to a fully extended position with respect thereto, and an elongated thrust member secured to said supporting arm adjacent the free end thereof and adapted to engage the load of freight, said hanger member and said supporting arm having plate portions one of which substantially overlies the other when said arm is in said fully retracted position and in which the edges thereof remote from said means are substantially parallel and which plate portions are relatively moved to reduce said overlying relation as said arm is pivotally moved toward said fully extended position in which position said edges are angularly disposed, and means for selectively interconnecting said plate portions at a plurality of selected positions of adjustment intermediate said fully retracted and fully extended positions.

2. A device as described in claim 1 in which the means for securing said thrust member to said supporting arm comprises an adapter bracket freely pivotally connected to the end of said supporting arm to permit the thrust member to adjust itself into a position substantially contiguous to the freight load.

3. A device as described in claim 1 in which the means for securing said thrust member to said supporting arm comprises a U-shaped adapter bracket in the channel of which the thrust member is secured, and a vertically extending freely pivotal connection between said adapter bracket and supporting arm to permit said thrust member to substantially align itself with the load of freight.

4. A device as described in claim 3 in which the pivotal connection between the channel-shaped adapter bracket and supporting arm comprises apertured ears punched from the base of the channel and a pivot pin extending through said apertures and mating apertures in the end of said supporting arm.

5. A device as described in claim 1 in which the supporting arm is secured in its adjusted position by passing a locking pin through registering apertures in said arm and hanger member.

6. A freight holding device adapted to occupy the space between a load of freight and the side wall of a freight car or other container, when the load of freight is insufficient to fill the width of the container, to hold the freight against the opposite side wall comprising, a hanger member, attachment fittings secured to said hanger member for detachably supporting said hanger member at selected positions on a belt rail secured to said first side wall, a supporting arm pivotally connected adjacent one end to said hanger member for angular adjustment from a substantially nested position to an extended position with respect thereto, apertures in said hanger member and supporting arm adapted to register in the various adjusted positions of said supporting arm, a locking pin for engaging registering apertures to lock said supporting arm in its adjusted positions, an adapter bracket pivotally connected to the free end of said supporting arm, and an elongated thrust member secured in said adapter bracket adapted to engage the load of freight, said hanger member being channel-shaped in cross section and substantially rectangular, and said supporting arm being channel-shaped in cross section and generally triangular, the larger end of said supporting arm being pivotally connected to one end of said hanger member between the side flanges thereof with the channels of said hanger member and supporting arm engaging one another, apertures in the adjacent flange portions of said hanger member and supporting arm adapted to register in the various adjusted positions of said supporting arm, and a locking pin for engaging registering apertures to lock said supporting arm in its adjusted positions, said supporting arm being substantially nested within the channel of the hanger member in its non-extended position.

7. A freight holding device adapted to occupy the space between a load of freight and the side wall of a freight car or other container, when the load of freight is insufficient to fill the width of the container, to hold the freight against the opposite side wall comprising, a hanger member, attachment fittings secured to said hanger member for detachably supporting said hanger member at selected positions on a belt rail secured to said first side wall, a supporting arm pivotally connected adjacent one end to said hanger member for angular adjustment from a substantially nested position to an extended position with respect thereto, apertures in said hanger member and supporting arm adapted to register in the various adjusted positions of said supporting arm, a locking pin for engaging registering apertures to lock said supporting arm in its adjusted positions, an adapter bracket pivotally connected to the free end of said supporting arm, and an elongated thrust member secured in said adapter bracket adapted to engage the load of freight, said hanger member and said supporting arm each being channel-shaped in cross section, one end of said supporting arm being pivotally connected to one end of said hanger member between the side flanges thereof whereby said supporting arm can be substantially nested within the channel of the hanger member in its nonextended positions, the channels of said hanger member and supporting arm being in confronting relation, a plurality of aligned, spaced apertures in the flanges of the hanger member, a complementary set of aligned, spaced apertures in the flanges of said supporting arm, the pattern of said apertures being such that sets of apertures in said supporting arm and hanger member will come into registration upon minute adjustments of said supporting arm, and a locking pin for engaging registering apertures to lock said supporting arm in its adjusted position.

References Cited by the Examiner
UNITED STATES PATENTS

| | | | |
|---|---|---|---|
| 1,833,764 | 11/31 | Tremblay et al. | 105—369 X |
| 1,963,545 | 6/34 | Campbell et al. | 105—369 |
| 2,965,346 | 12/60 | Collins et al. | 248—223 |

EUGENE G. BOTZ, *Primary Examiner.*

JAMES S. SHANK, LEO QUACKENBUSH, *Examiners.*